(12) United States Patent
Joon-Kyu

(10) Patent No.: US 11,180,120 B2
(45) Date of Patent: Nov. 23, 2021

(54) ACTUATOR FOR ELECTRIC PARKING BRAKE

(71) Applicant: MANDO CORPORATION, Pyeongtaek-si (KR)

(72) Inventor: Song Joon-Kyu, Seongnam-si (KR)

(73) Assignee: Mando Corporation, Pyeongtaek-si (KR)

(*) Notice: Subject to any disclaimer, the term of this patent is extended or adjusted under 35 U.S.C. 154(b) by 202 days.

(21) Appl. No.: 16/519,817

(22) Filed: Jul. 23, 2019

(65) Prior Publication Data
US 2020/0031321 A1 Jan. 30, 2020

(30) Foreign Application Priority Data
Jul. 26, 2018 (KR) .................... 10-2018-0087315

(51) Int. Cl.
*B60T 7/04* (2006.01)
*B60T 13/74* (2006.01)
*F16H 1/30* (2006.01)

(52) U.S. Cl.
CPC ............ *B60T 7/045* (2013.01); *B60T 13/746* (2013.01); *F16H 1/30* (2013.01)

(58) Field of Classification Search
CPC ...... F16D 65/18; F16H 57/039; F16H 57/082; F16H 1/28; F16H 1/30; F16H 2057/02034; B60T 13/746; B60T 17/045

(Continued)

(56) References Cited

U.S. PATENT DOCUMENTS

2010/0193302 A1* 8/2010 Schumann ............... F16D 65/18
188/105
2012/0325601 A1* 12/2012 Giering ............... F16D 65/0006
188/162

(Continued)

FOREIGN PATENT DOCUMENTS

KR 10-2012-0048232 A 5/2012
KR 10-2016-0138287 A 12/2016

(Continued)

OTHER PUBLICATIONS

English machined translation of KR-101836128 B1, from IDS Mar. 9, 2018.*

(Continued)

*Primary Examiner* — Robert A. Siconolfi
*Assistant Examiner* — San M Aung
(74) *Attorney, Agent, or Firm* — Morgan, Lewis & Bockius LLP

(57) ABSTRACT

The present invention relates to an actuator for an electronic parking brake. The actuator for an electronic parking brake of the present invention includes a motor configured to provide a driving force, and a housing in which a gear unit for transmitting the driving force of the motor is mounted. The gear unit includes a worm gear to which the driving force of the motor is transmitted, a plurality of planetary gears coupled to an outer side of a sun gear which is provided in the worm gear, and a carrier configured to rotatably support the planetary gears, have the same rotation shaft as a rotation shaft of the sun gear, and output the driving force. A carrier accommodation unit coupled to outer sides of the planetary gears is formed in the housing.

10 Claims, 4 Drawing Sheets

(58) Field of Classification Search
USPC .................................................. 188/151 R
See application file for complete search history.

(56) References Cited

U.S. PATENT DOCUMENTS

2015/0136542 A1* 5/2015 Goh .................. F16D 65/18
                                                                                                    188/162
2017/0023081 A1* 1/2017 Sala .................. F16D 55/226

FOREIGN PATENT DOCUMENTS

KR       10-1836128 B1    3/2018
WO      2015151052 A1   10/2015

OTHER PUBLICATIONS

Korean Office Action dated Sep. 19, 2019 issued in Korean Patent Application No. 10-2018-0087315.

* cited by examiner

[FIG 1]
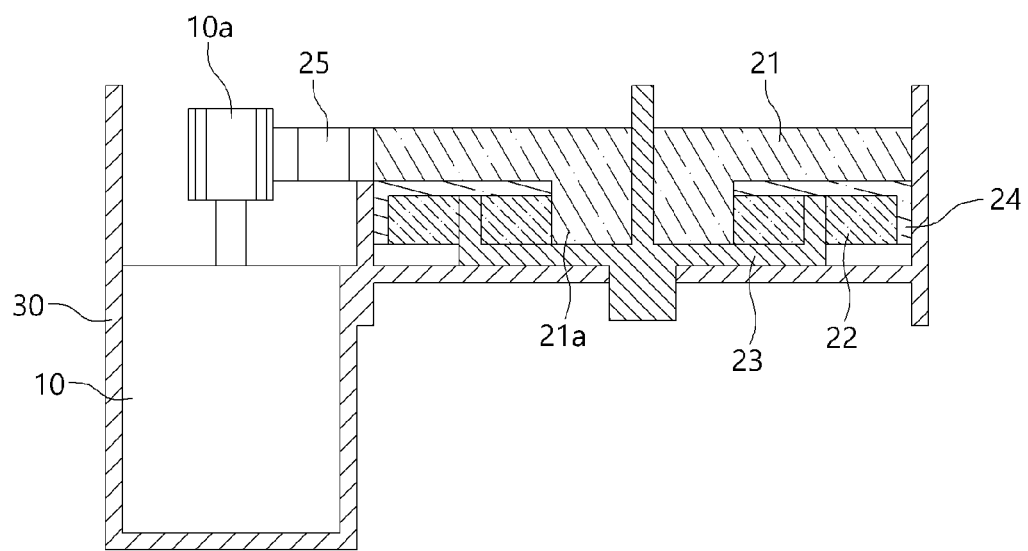

[FIG 2]
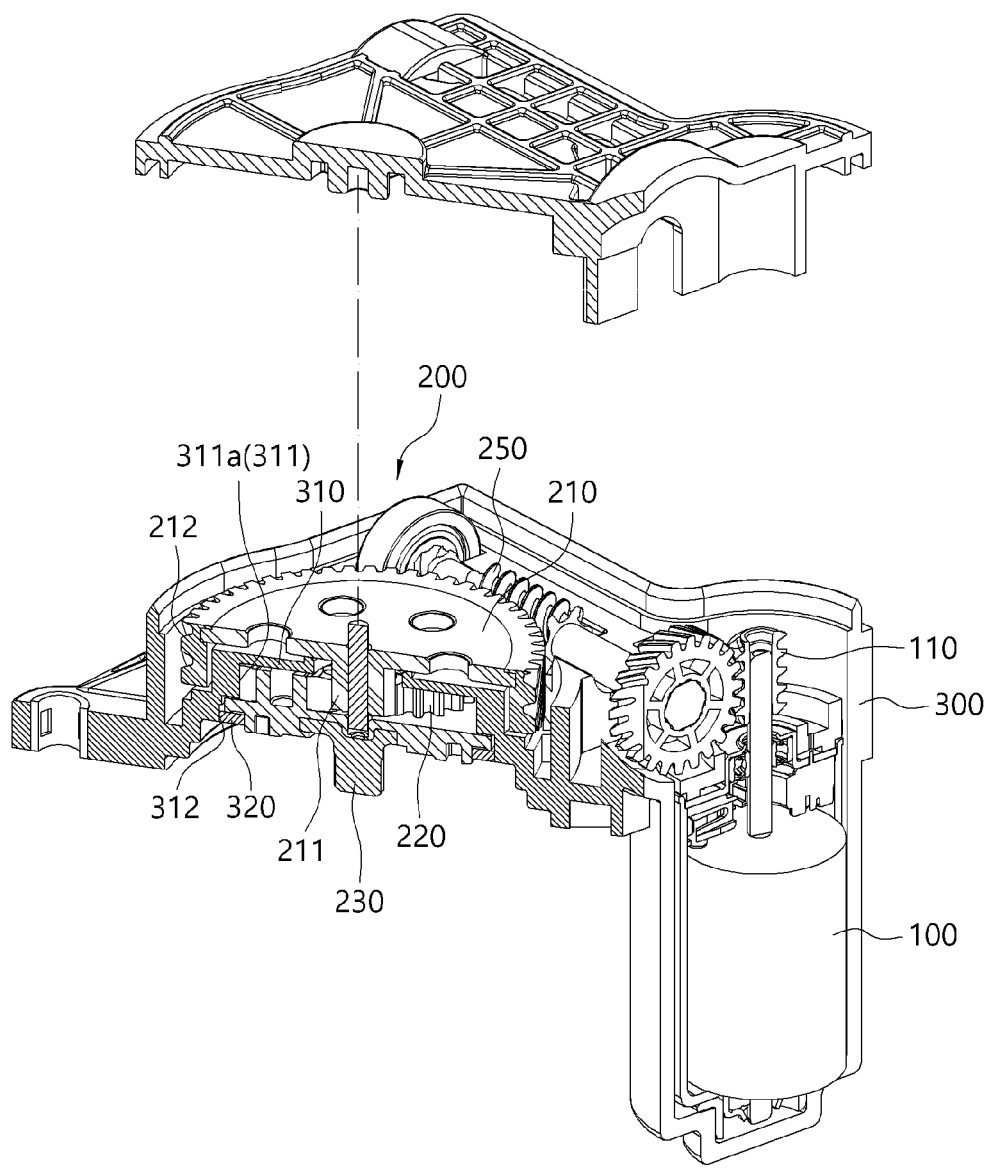

[FIG 3]
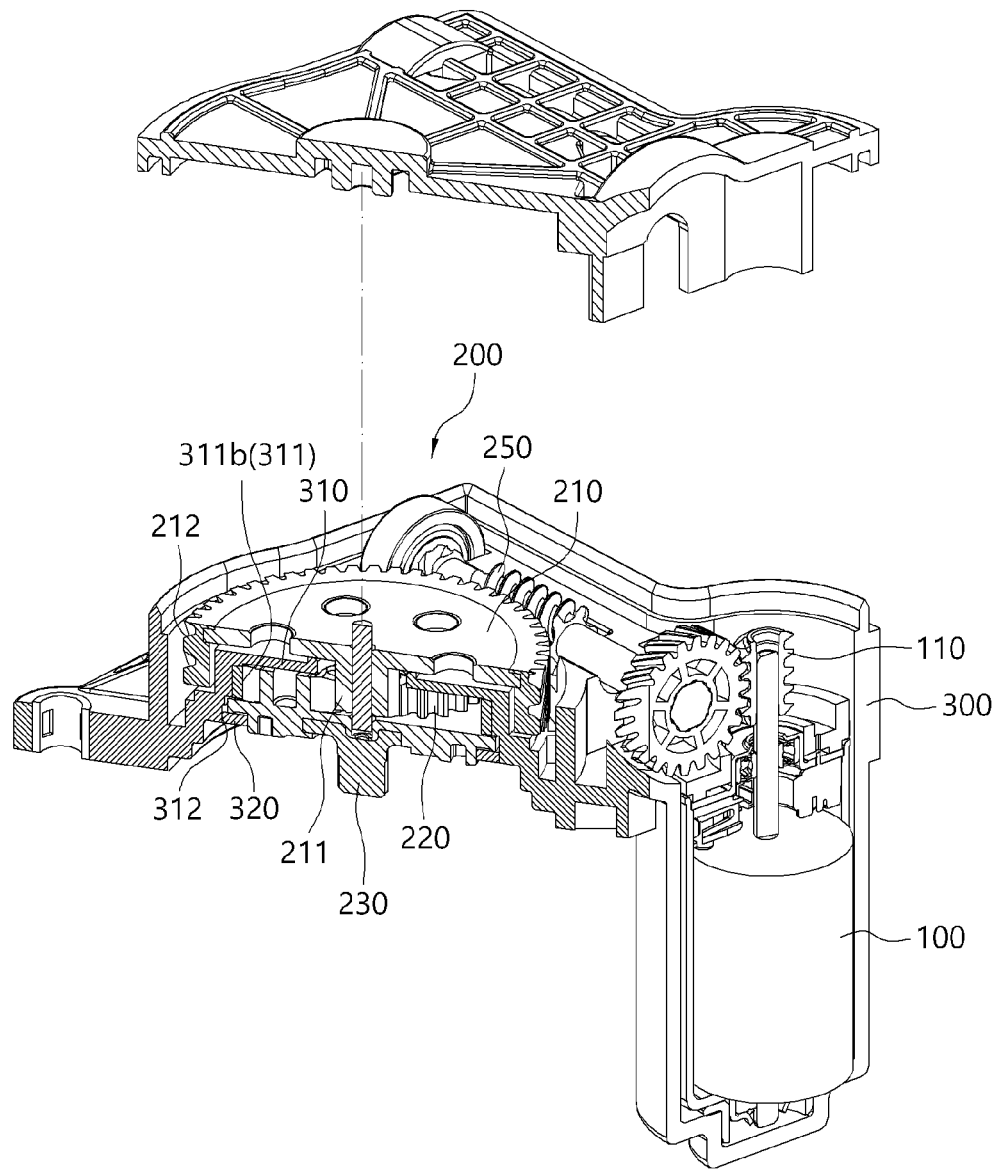

[FIG 4]
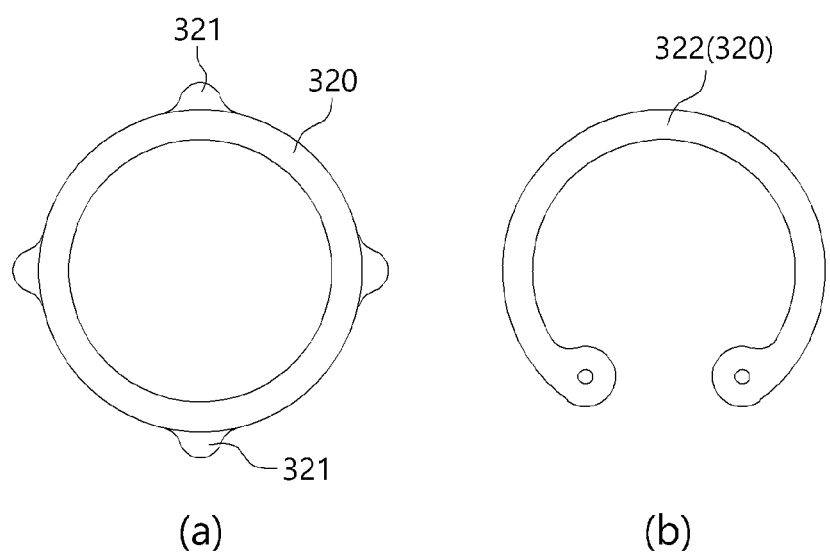
(a)  (b)

ACTUATOR FOR ELECTRIC PARKING BRAKE

CROSS-REFERENCE TO RELATED APPLICATION

This application claims priority to and the benefit of Korean Patent Application No. 2018-0087315, filed on Jul. 26, 2018, the disclosure of which is incorporated herein by reference in its entirety.

BACKGROUND

1. Field of the Invention

The present invention relates to an actuator for an electronic parking brake.

2. Discussion of Related Art

Generally, brake devices are devices for stopping vehicles from moving when braking or parking the vehicles and serves to prevent wheels of the vehicles from rotating.

Recently, electronic parking brake (EPB) systems that electronically control the driving of parking brakes are in wide use, and the EPB systems are mounted in general disk brakes to perform a function of a parking brake. The EPB systems include cable puller type EPB systems, motor-on-caliper (MOC) type EPB systems, and hydraulic parking brake systems.

FIG. 1 is a cross-sectional view showing an actuator for an MOC type EPB system. In the actuator for an MOC type EPB system, a motor 10 for generating power is connected to the actuator. The power generated from the motor 10 is decelerated using a plurality of gears while a torque is increased, and the power is transmitted to the actuator and a caliper, thereby performing a braking operation.

When a rotation shaft 10a of the motor 10 rotates, a transmitting member 25 which is connected to the rotation shaft 10a rotates, and a worm gear 21 rotates together with the transmitting member 25. When the worm gear 21 rotates, a sun gear 21a formed therein rotates together with the worm gear 21, and a planetary gear 22 surrounding the sun gear 21a rotates due to the rotation of the sun gear 21a. The planetary gear 22 rotates a carrier 23 while revolving along an inner circumferential surface of the ring gear 24 so that a driving force of the motor 10 is transmitted through an output shaft of the carrier 23.

In addition, the motor 10 and the plurality of gear parts are assembled downward from above a housing 30. That is, the plurality of gear parts are assembled in a method in which the carrier 23 and the planetary gear 22 are mounted in the housing 30 in an assembled state (a carrier assembly), the ring gear 24 is mounted above the carrier assembly, and then the worm gear 21 is mounted in the ring gear 24. When the motor 10 and the plurality of gear parts are assembled in this manner, the number of parts is increased, which makes maintenance difficult. As a result, there is a limitation in that productivity is lowered because assembly time is increased due to an increase in assembling man-hours.

Therefore, there is a need for overall improvement in these disadvantages.

DOCUMENT OF RELATED ART

Patent Document (Patent Document 1) Korean Patent Registration No. 10-2012-0048232 (Published on May 15, 2012)

SUMMARY OF THE INVENTION

The present invention is directed to providing an actuator for an electronic parking brake in which a motor and a plurality of gear parts are used and the number of parts and assembling man-hours can be reduced.

According to an aspect of the present invention, there is provided an actuator for an electronic parking brake, which includes a motor configured to provide a driving force, and a housing in which a gear unit for transmitting the driving force of the motor is mounted. The gear unit may include a worm gear to which the driving force of the motor is transmitted, a plurality of planetary gears coupled to an outer side of a sun gear which is provided in the worm gear, and a carrier configured to rotatably support the planetary gears, have the same rotation shaft as a rotation shaft of the sun gear, and output the driving force. A carrier accommodation unit coupled to outer sides of the planetary gears may be formed in the housing.

An upwardly extending accommodation surface may be formed in the carrier accommodation unit, and the planetary gears and the carrier may be assembled to the carrier accommodation unit along the accommodation surface upward from below the carrier accommodation unit.

In this case, a first gear surface coupled to the outer sides of the planetary gears may be formed in the accommodation surface.

Alternatively, a ring gear coupled to the outer sides of the planetary gears may be fixed to the accommodation surface by a dual injection method.

A downwardly extending guide surface may be formed in the worm gear, and the guide surface may surround an outer circumferential surface of the carrier accommodation unit.

In this case, a second gear surface may be formed on an outer circumferential surface of the guide surface to transmit the driving force of the motor.

A fixing member configured to prevent the carrier from being separated downward may be provided on a lower end of the carrier accommodation unit.

In this case, a friction surface configured to support the fixing member may be formed on the lower end of the carrier accommodation unit.

A protrusion extending outward in a radial direction may be formed in the fixing member, and the protrusion may be supported by the friction surface while being elastically deformed.

Alternatively, the fixing member may be a snap ring supported by the friction surface.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a cross-sectional view showing a conventional actuator for an electronic parking brake;

FIG. 2 is a cross-sectional view showing an actuator for an electronic parking brake according to an embodiment of the present invention;

FIG. 3 is a cross-sectional view showing an actuator for an electronic parking brake according to another embodiment of the present invention; and FIG. 4 shows plan views showing fixing members according to the present invention in accordance with the respective embodiments.

DETAILED DESCRIPTION OF EXEMPLARY EMBODIMENTS

Hereinafter, embodiments of the present invention that can be easily performed by those skilled in the art will be described in detail with reference to the accompanying drawings. The present invention may be implemented in several different forms and is not limited to the embodiments described herein. Parts irrelevant to description are omitted in the drawings in order to clearly explain the present invention. The same or similar components are denoted by the same reference numerals throughout this specification.

It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof. In addition, when a layer, film, region, or plate is referred to as being "formed on" another layer, film, region, or plate, it includes a case in which the layer, film, region, or plate is formed directly on another layer, film, region, or plate and a case in which the other layer, film, region, or plate is interposed between the layer, film, region, or plate and another layer, film, region, or plate. In contrast, when a layer, film, region, or plate is referred to as being "formed below" another layer, film, region, or plate, it includes a case in which the layer, film, region, or plate is formed directly below another layer, film, region, or plate and a case in which the other layer, film, region, or plate is interposed between the layer, film, region, or plate and another layer, film, region, or plate.

FIG. 1 is a cross-sectional view showing a conventional actuator for an electronic parking brake, FIG. 2 is a cross-sectional view showing an actuator for an electronic parking brake according to an embodiment of the present invention, FIG. 3 is a cross-sectional view showing an actuator for an electronic parking brake according to another embodiment of the present invention, and FIG. 4 shows plan views showing fixing members according to the present invention in accordance with the respective embodiments.

As shown in FIG. 2, the actuator for an electronic parking brake according to the embodiment of the present invention may be an actuator for an electronic parking brake which includes a motor 100 configured to provide a driving force and a housing 300 in which a gear unit 200 for transmitting the driving force of the motor 100 is mounted. The gear unit 200 may include a worm gear 210 to which the driving force of the motor 100 is transmitted, a plurality of planetary gears 220 which are coupled to an outer side of a sun gear 211 provided in the worm gear 210, and a carrier 230, which rotatably supports the planetary gears 220, has the same rotation shaft as a rotation shaft of the sun gear 211, and outputs the driving force. In this case, a carrier accommodation unit 310 coupled to an outer side of the planetary gear 220 may be formed in the housing 300.

The motor 100 receives power by operation of a switch (not shown) provided in a driver's seat of a vehicle and converts electrical energy into mechanical rotational kinetic energy. Control of a braking operation according to an operation signal of the switch is performed by an electronic control unit (ECU) of the vehicle.

In the housing 300, a portion in which the motor 100 is provided and a portion in which the gear unit 200 for transmitting the driving force of the motor 100 is provided are formed. The portion in which the motor 100 is provided is provided in the form of a circular hollow hole, and the portion in which the gear unit 200 is provided is also formed in a cylindrical shape so that the plurality of gears can be stacked. In this case, the portion in which the motor 100 is provided and the portion in which the gear unit 200 is provided may be provided in parallel, and the motor 100 and the gear unit 200 may be compactly provided in a cylindrical portion of a caliper housing.

A separate housing cover may be provided in the housing 300, and the housing 300 and the housing cover may be made of a synthetic resin material. The motor 100 and the gear unit 200 may be fixedly provided in an inner side of the housing 300, and the housing cover may be coupled to the housing 300. Coupling portions corresponding to each other may be formed in the housing 300 and the housing cover to couple the housing 300 and the housing cover so that the inner side of the housing 300 may be easily sealed.

In addition, a connector for electrically connecting a power supply line of the motor 100 to an external power supply may be provided on one side of the housing 300.

In order to transmit the driving force of the motor 100, a helical gear is provided on a rotation shaft 110 of the motor 100, and a transmitting member 250 which is engaged with the helical gear is provided. The helical gear rotates about the rotation shaft 110 of the motor 100, and the transmitting member 250 engaged with the helical gear rotates while switching a rotation direction to a direction perpendicular to the rotation shaft 110 of the motor 100. Since the helical gear has a better engagement ratio than a spur gear, noise may be significantly reduced due to the switching of the rotation direction using the helical gear, and the switching of the rotation direction using the helical gear may be used as a reduction function when a gear ratio is adjusted.

As described above, the driving force of the motor 100 is transmitted to the worm gear 210 through the rotation shaft 110, the helical gear, and the transmitting member 250. The worm gear 210 is engaged with the transmitting member 250 to rotate and switches the rotation direction to a vertical direction again so that the rotation shaft 110 of the motor 100 and a rotation shaft of the worm gear 210 are in parallel.

The sun gear 211 is provided in the worm gear 210, the plurality of planetary gears 220 are rotatably coupled to an outer side of the sun gear 211, and the carrier 230, which rotatably supports the planetary gear 220 and outputs the transmitted driving force, is provided.

In this case, the carrier accommodation unit 310 coupled to the outer side of the planetary gear 220 is formed in the housing 300. That is, the planetary gear 220 outputs the driving force through the carrier 230 while rotating along an inner circumferential surface of the carrier accommodation unit 310.

Further, an upwardly extending accommodation surface 311 is formed in the carrier accommodation unit 310, and the planetary gears 220 and the carrier 230 are assembled to the carrier accommodation unit 310 along the accommodation surface 311 upward from below the carrier accommodation unit 310.

That is, since the planetary gears 220 and the carrier 230 are assembled to the accommodation surface 311 formed in the carrier accommodation unit 310, there is no need to use the ring gear that is conventionally used. Therefore, the number of parts is reduced so that the management thereof is easy, and assembling man-hours are reduced due to the elimination of the ring gear assembly process so that productivity is improved.

In this case, a first gear surface 311*a* may be directly formed in the accommodation surface 311 so as to be coupled to the outer side of the planetary gear 220, as shown in FIG. 2, or a ring gear 311*b* may be fixedly formed by a dual injection method, as shown in FIG. 3.

When the housing 300 of a synthetic resin material is injected, the housing 300 may be manufactured by inserting the ring gear 311*b* thereinto by a dual injection method.

Further, a downwardly extending guide surface 212 is formed in the worm gear 210, and the guide surface 212 has a nested structure surrounding an outer circumferential surface of the carrier accommodation unit 310.

That is, the sun gear 211 protruding in an axial direction is formed inside the worm gear 210 and, accordingly, a predetermined space is formed between an inner circumferential surface of the guide surface 212 which is formed in the worm gear 210 and an outer circumferential surface of the sun gear 211. The carrier accommodation unit 310, the planetary gear 220, and the sun gear 211 are accommodated in such a space while being engaged with each other. As described above, since the carrier accommodation unit 310, the planetary gear 220, and the sun gear 211 may be provided at the same height on the housing 300 inside the worm gear 210, the gear unit 200 may be compactly formed by reducing a vertical length thereof.

In addition, a second gear surface 212*a* may be formed in an outer circumferential surface of the guide surface 212 so that the driving force of the motor 100 is transmitted. Since the second gear surface 212*a* is formed in the guide surface 212 surrounding the carrier accommodation unit 310 while extending downward, the transmitting member 250 which is engaged with the second gear surface 212*a* and the helical gear may be disposed at a low vertical height and may be compactly formed.

In addition, as shown in FIGS. 2 and 3, a fixing member 320 may be provided on a lower end of the carrier accommodation unit 310 to prevent the carrier 230 from being separated downward.

As described above, a downward opening is formed in the carrier accommodation unit 310, and the carrier 230 is assembled to the carrier accommodation unit 310 along the accommodation surface 311 upward from below the carrier accommodation unit 310. It is necessary to support the carrier 230 so that the carrier 230 is not separated downward by gravity before it is coupled to a spindle and the caliper housing after the assembly, and the fixing member 320 is provided on the lower end of the carrier accommodation unit 310.

In addition, a friction surface 312 which supports the fixing member 320 may be formed on the lower end of the carrier accommodation unit 310.

The fixing member 320 is formed of a member capable of being elastically deformed and is elastically deformed by applying an external force to the fixing member 320 after the carrier 230 is assembled. In the above state, when the fixing member 320 is inserted into the lower end of the carrier accommodation unit 310 and then the external force is removed, the fixing member 320 is elastically restored and supports the carrier 230 while being in contact with the friction surface 312 formed on the lower end of the carrier accommodation unit 310.

As shown in FIG. 4A, protrusions 321 extending outward in a radial direction are formed on the fixing member 320, and the protrusions 321 are supported by the friction surface 312 while being elastically deformed.

That is, an outer diameter of a body of the fixing member 320 is smaller than or equal to an inner diameter of the carrier accommodation unit 310. When an outer diameter of the protrusion 321 extending outward from the body in the radial direction is greater than the inner diameter of the carrier accommodation unit 310, the protrusions 321 may be fixed to the inner circumferential surface of the carrier accommodation unit 310 while being elastically deformed.

Alternatively, as shown in FIG. 4B, the fixing member 320 may be a snap ring 322 supported by the friction surface 312.

That is, the outer diameter of the fixing member 320 is slightly greater than the inner diameter of the carrier accommodation unit 310. After the carrier 230 is assembled, the fixing member 320 is elastically deformed due to an external force being applied thereto. In the above state, when the fixing member 320 is inserted into the lower end of the carrier accommodation unit 310 and then the external force is removed, the fixing member 320 is elastically restored and supports the carrier 230 while being in contact with the friction surface 312 formed on the lower end of the carrier accommodation unit 310.

As described above, the fixing member 320 may be fixed to be supported by the friction surface 312 formed on the lower end of the carrier accommodation unit 310. Alternatively, an insertion groove (not shown), into which the fixing member 320 may be inserted while being elastically restored to a position of the friction surface 312, may be formed.

That is, the fixing member 320 for preventing the separation of the carrier 230 may be provided on the lower end of the carrier accommodation unit 310, and thus it is possible to stably support the carrier 230 until the assembly of the actuator is completed.

In the actuator for an electronic parking brake of the present invention having the above-described configuration, a carrier accommodation unit having a first gear surface formed to be coupled to an outer side of a planetary gear is formed in a housing, and thus there is no need to use a ring gear. Therefore, the number of parts can be reduced so that the management thereof may be easy, and assembling man-hours can be reduced due to the elimination of a ring gear assembly process so that productivity can be improved.

Further, since a carrier accommodation unit, a planetary gear, and a sun gear can be provided at the same height inside a worm gear to which a driving force of a motor is transmitted, a gear unit can be compactly formed by reducing a vertical length thereof.

In addition, a fixing member for preventing the separation of the carrier can be provided on a lower end of the carrier accommodation unit, and thus it is possible to stably support the carrier until the assembly of the actuator is completed.

While the present invention has been described with reference to exemplary embodiments thereof, the spirit of the present invention is not limited to the embodiments presented in this specification. Those skilled in the art who understand the spirit of the present invention may easily suggest other embodiments by adding, changing, or deleting elements within the scope of the same concept, and the other embodiments are also within the spirit of the present invention.

What is claimed is:

1. An actuator for an electronic parking brake comprising:
    a motor configured to provide a driving force;
    a housing in which a gear unit for transmitting the driving force of the motor is mounted, wherein the gear unit includes:
        a worm gear to which the driving force of the motor is transmitted;
        a plurality of planetary gears coupled to an outer side of a sun gear which is disposed in the worm gear; and
        a carrier configured to rotatably support the planetary gears, have the same rotation shaft as a rotation shaft of the sun gear, and output the driving force; and
    a carrier accommodation unit coupled to outer sides of the plurality of planetary gears disposed in the housing, wherein the carrier accommodation unit includes:
        an upwardly extending accommodation surface upwardly extending toward the worm gear from a lower end of the carrier accommodation unit; and
        an inwardly extending accommodation surface integrally extending from the upwardly extending accommodation surface radially inwardly toward a rotation axis of the gear unit and disposed below the worm gear to correspond a lower surface of the worm gear, the inwardly extending accommodation surface disposed between the worm gear and the plurality of planetary gears to cover the plurality of planetary gears from the worm gear.

2. The actuator for an electronic parking brake of claim 1, wherein the plurality of planetary gears and the carrier are assembled to the carrier accommodation unit along the accommodation surface upward from below the carrier accommodation unit.

3. The actuator for an electronic parking brake of claim 2, wherein a first gear surface coupled to the outer sides of the plurality of planetary gears is formed in the accommodation surface.

4. The actuator for an electronic parking brake of claim 2, wherein a ring gear coupled to the outer sides of the plurality of planetary gears is fixed to the accommodation surface by a dual injection method.

5. The actuator for an electronic parking brake of claim 1, wherein the worm gear has a downwardly extending guide surface therein, and
    wherein the guide surface surrounds an outer circumferential surface of the carrier accommodation unit.

6. The actuator for an electronic parking brake of claim 5, wherein a second gear surface is formed on an outer circumferential surface of the guide surface to transmit the driving force of the motor.

7. The actuator for an electronic parking brake of claim 1, wherein the carrier accommodation unit further comprises a fixing member, which is configured to prevent the carrier from being separated downward, on the lower end of the carrier accommodation unit.

8. The actuator for an electronic parking brake of claim 7, wherein the carrier accommodation unit further comprises a friction surface, which is configured to support the fixing member, on the lower end of the carrier accommodation unit.

9. The actuator for an electronic parking brake of claim 8, wherein a protrusion extending outward in a radial direction is formed in the fixing member, and
    wherein the protrusion is supported by the friction surface while being elastically deformed.

10. The actuator for an electronic parking brake of claim 8, wherein the fixing member is a snap ring supported by the friction surface.

* * * * *